US005581258A

United States Patent [19]

[11] Patent Number: 5,581,258
[45] Date of Patent: Dec. 3, 1996

Arico

[54] PORTABLE ANTENNA CONTROLLER

[75] Inventor: Joseph A. Arico, Broomall, Pa.

[73] Assignee: The United States of America as represented by the Secretary of the Navy, Washington, D.C.

[21] Appl. No.: 475,168

[22] Filed: Jun. 7, 1995

[51] Int. Cl.[6] ....... G01S 7/40

[52] U.S. Cl. ....... 342/165

[58] Field of Search ....... 342/74, 173, 174, 342/165

[56] References Cited

U.S. PATENT DOCUMENTS 4,912,476 3/1990 Miller et al. ....... 342/359
5,371,508 12/1994 Teich et al. ....... 343/703
5,396,255 3/1995 Durkota et al. ....... 342/360

*Primary Examiner*—Ian J. Lobo
*Attorney, Agent, or Firm*—Susan E. Verona

[57] ABSTRACT

A portable antenna control unit that operates a radar antenna and simulates various control signals that are generated by a fire control radar. The antenna control unit can be interfaced to a standard commercial, portable computer, or it can be portable, stand-alone unit, manually controlled and easily transported to a test range. Both embodiments diagnose problems in an antenna radar system antenna without installing an entire radar system.

8 Claims, 3 Drawing Sheets

PORTABLE ANTENNA CONTROLLER

The invention described herein may be manufactured and used by or for the Government of the United States of America for governmental purposes without payment of any royalties thereon or therefor.

BACKGROUND OF THE INVENTION

This invention relates specifically to the F/A 18 jet fighter aircraft fire control radar system APG65/73. This invention will be used to control and operate a APG65/73 radar set antenna, the AS3254 antenna and to simulate the various control signals that are generated by the APG65/73 fire control radar.

The AS3254/APG65/73 fire control radar antenna is an integral part of the APG65 radar system used for the search, track and destruction of enemy aircraft. The Navy uses the AS3254/APG65/73 fire control radar antenna to perform antenna testing and evaluation, There was a need in the Navy to control the APG3254/APG65/73 antenna without installing the entire radar system, therefore an antenna control and interface unit 1 was designed and built to interface the antenna measurements computer 2 to the AS3254/APG65/73 antenna 3 (See FIG. 1). This antenna control and interface has given the Navy the ability to do measurements utilizing the AS3254/APG65/73 antenna 3.

Prior to the design and construction of this device there was no "stand-alone", portable AS3254/APG65/73 antenna control unit that could be interfaced to a standard commercial, portable computer or a portable unit manually controlled and easily transported to a test range. The present invention enables the Navy to troubleshoot and diagnose problems in the AS3254/APG65/73 antenna radar system antenna 3 without installing the entire radar system. The present invention, used with a commercial computer or in a stand alone embodiment, is lightweight and easily transported to a test range.

SUMMARY OF THE INVENTION

This invention will enable the use of the AS3254/APG65/73 antenna system without the APG65/73 radar system and enables automated testing of the AS3254 antenna using a portable commercial computer.

The antenna control unit 1 (ACIU) operates by simulating the signals sent to the AS3254/APG65/73 radar antenna by the APG65/73 fire control radar system.

The antenna has 4 modes of operation (TABLE 1), the receive mode, D/A mode, send mode and gap mode. The ACIU generates the "ANT X" and "ANT R" signals that are needed to put the antenna in receive mode and the D/A mode. When the antenna goes to receive mode, three 16 bit words are sent from the ACIU to the circuitry in the servo electronics unit in the antenna, this causes the antenna to drive to the proper angular position. The 3 digital control words are the "D0", "A01", and "A02". See TABLE 2 for description of the contents of these control words.

The ACIU is comprised of three 16 bit shift registers connected in series 11, 12, 13 (See FIG. 2). The CLK signal 5 is created by the master 1 mhz clock 6. The "ANT X" signal 7 is created by counter "B" 8, the "ANT R" signal 9 is created by counter "A" 10. The control words D0, A01, and A02, are placed in the shift registers and are serially shifted out of each register and into the next register in the chain and serially out of the last shift register and out the "DATA OUT" 14 line of the ACIU. These four signals CLK 5, ANT R 9, ANT X 7, and DATA OUT 14, are then sent to 4 differential line drivers 18, 21, 22, 23 which are connected to the antenna inputs.

DETAILED DESCRIPTION

The invention provides complete power control and overcurrent protection by means of switches and fuses of the 28 vdc, +–20 vdc, +10 vdc, +5 vdc, 115 vac 400 Hz and 115 vac 60 Hz and the invention provides the four logic signals necessary to control the AS3254/APG65/73 radar antenna. These signals are the 1 mhz clock signal (CLK) 5, the antenna receive signal (ANT R) 9, The antenna transmit signal (ANT X) 7, and the data serial output signal (DATA OUT) 14. (See FIG. 5).

Figure 1:
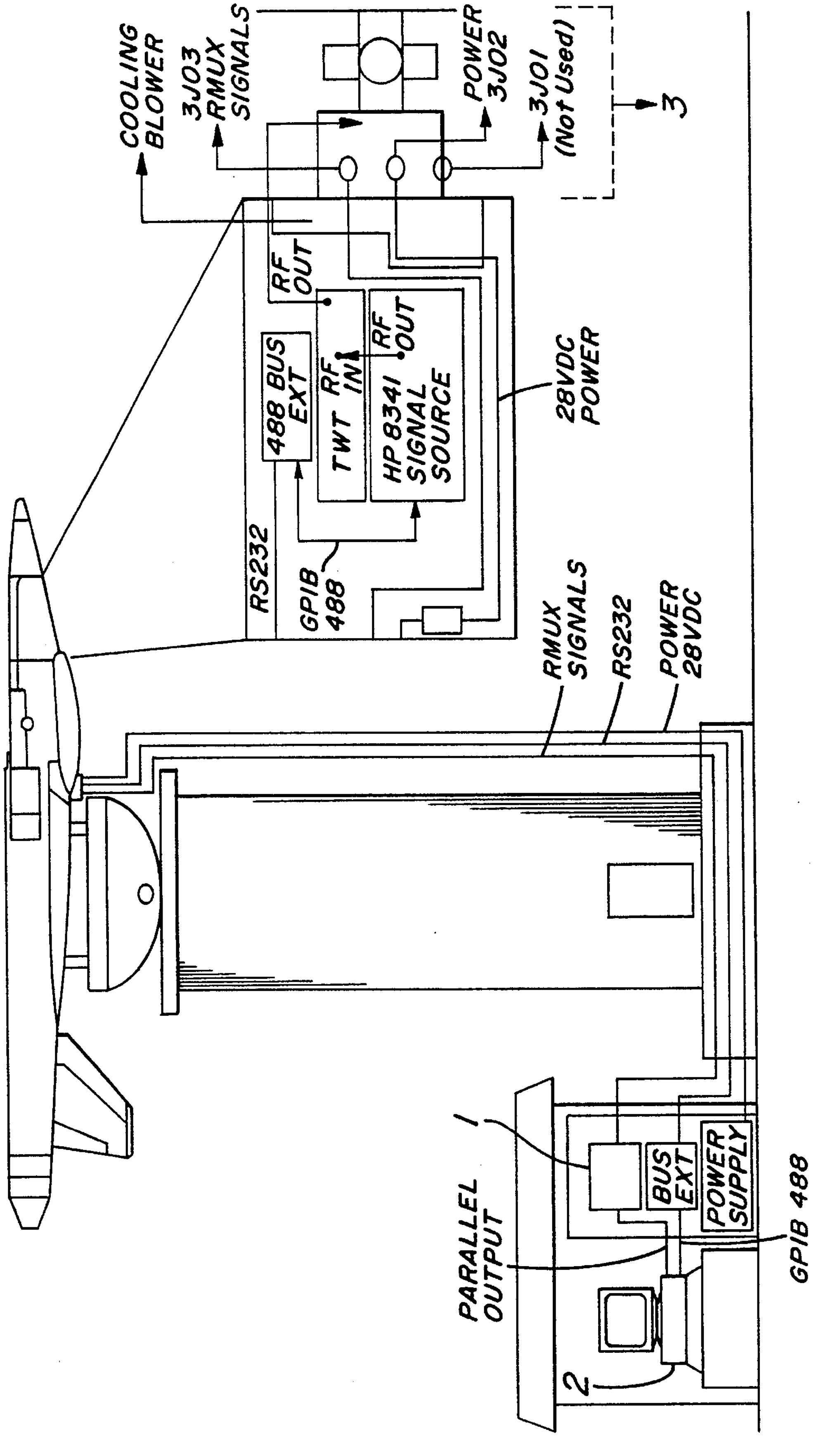
FIG. 1 Full Scale F-18 Test Range
Figure 2:
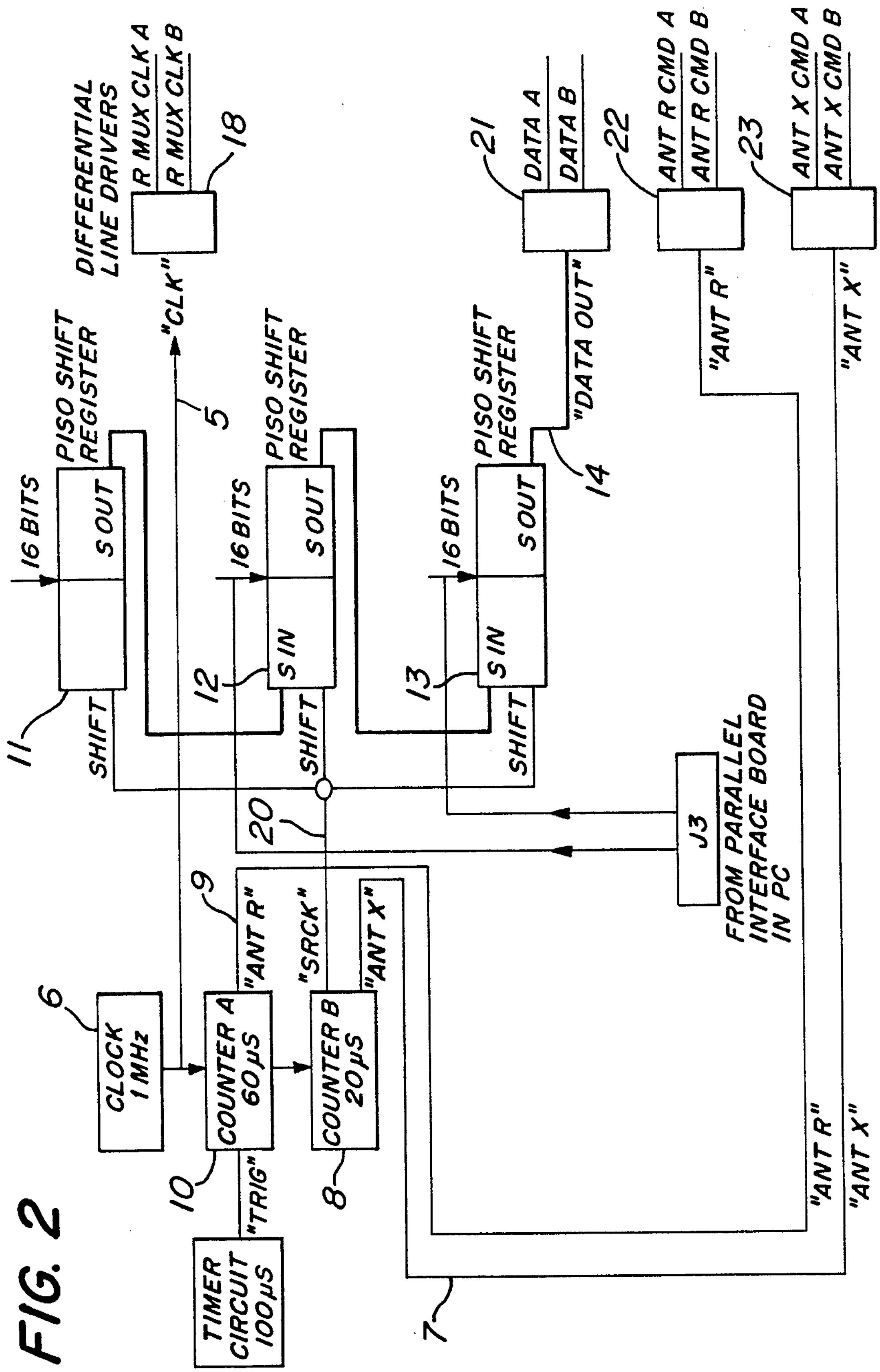
FIG. 2 AS 3254 Antenna Control Block Diagram
Figure 3:
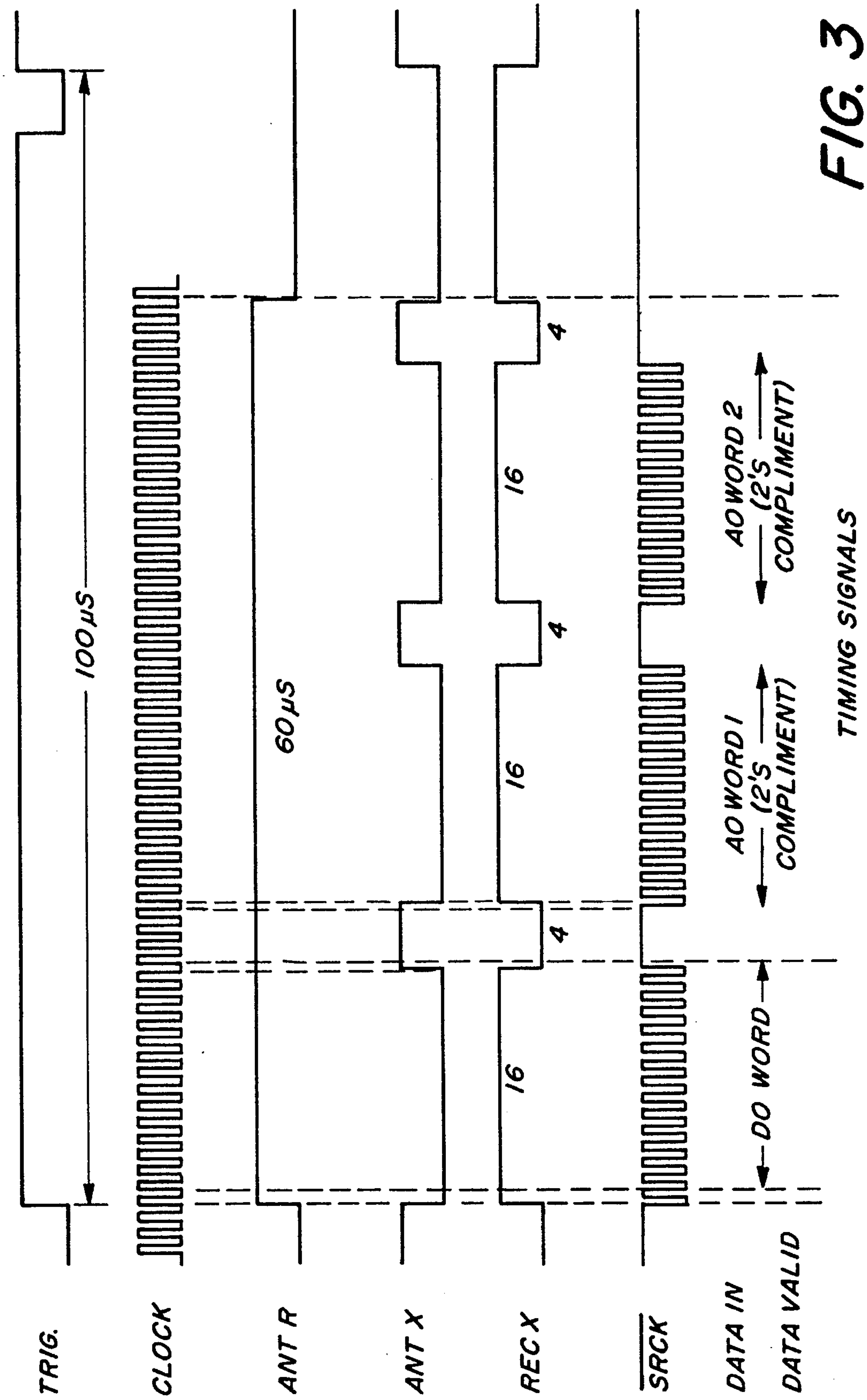
FIG. 3 Timing Signals for the AS 3254 Antenna Control

In the preferred embodiment a 1 mhz clock signal is generated by a 2 mhz oscillator module that is divided by 2 using a "D" flip flop and then drives a synchronizing counter circuit which counts to 60 (ANT R) then resets the output from this counter which then is applied to an "OR" gate and combined with the 1 mhz clock signal to create a series of 60 1 mhz pulses. These pulses then clock another counter which counts to 20 and then resets creating the "REC X" signal (See FIG. 3). The "ANT X" signal 7 is created by applying "REC X" to an inverter. The "SRCK" 20 signal is generated by applying the "REC X" signal to on "OR" gate and combining with the 1 mhz clock which creates three 16 bit words with a 4 us gap between them. A timer circuit continuously triggers this process every 100 us. (See the TRIG. signal in FIG. 3)

The "SRCK" 20 is then used to clock 6 PISO (Parallel In Serial Out) shift registers connected in series. The input to these shift registers can be controlled by a computer or manually by six 8-bit dip switches which are fed into the parallel inputs of the shift registers. When a computer interface is wired into the circuit all dip switches to the off position when the computer is driving the circuit. After the shift registers are loaded, the "SRCK" signal 20 then shifts the data out of the shift registers to the differential line drivers circuits, then out to the antenna.

TABLE 1

| ANT X | ANT R | MODE | DESCRIPTION |
|---|---|---|---|
| 0 | 1 | RECEIVE | THREE SERIAL DIGITAL WORDS ARE RECEIVED FROM THE RADAR MUX IN THE FOLLOWING SEQUENCE: D0 WORD, A01 WORD AND A02 WORD. |
| 0 | 0 | D/A | THE 101, A02 AND NULL WORDS ARE CONVERTED FROM DIGITAL |

TABLE 1-continued

| ANT X | ANT R | MODE | DESCRIPTION |
|---|---|---|---|
| | | | TO ANALOG IN THAT ORDER. THE THREE CONVERSIONS ARE CYCLIC UNTIL THE MODE CHANGES. |
| 1 | 0 | SEND (A/D) | THE AI WORDS ARE SEQUENTIALLY CONVERTED FROM ANALOG TO DIGITAL AND SENT ALONG WITH THE DI WORD TO THE RADAR MUX. THE FIRST AND SECOND SERIAL WORDS TRANSMITTED ARE THE DI WORD AND A "DUMMY" WORD. DURING THIS TIME, THE FIRST AI WORD IS CONVERTED. IT IS THEN TRANSMITTED AS THE THIRD SERIAL WORD AND SIMULTANEOUSLY THE CONVERSION OF THE NEXT AI WORD BEGINS. THEREAFTER, ALL VALID AI TRANSMISSIONS OCCUR DURING EVERY OTHER RADAR MUX WORD TRANSMISSION. THE VALID WORDS ARE SEPARATED BY MEANINGLESS "DUMMY WORDS" TO ALLOW THE 40 USEC REQUIRED FOR THE CONVERSION OF THE NEXT AI WORD. |
| 1 | 1 | GAP | THIS MODE IS REALLY A SUBSET OF THE RECEIVE AND AD CONVERT AND SEND MODES WHICH ALLOWS FOR THE INTERWORD GAP OF 4 BIT TIMES BETWEEN EACH RECEIVED OR TRANSMITTED WORD. |

TABLE 2

| WORD | BIT | SIGNAL TITLE | FUNCTION | |
|---|---|---|---|---|
| 1 | 0 | MUX LOOP TEST | RDP R-MUX TEST BIT | |
| | 1,2 | AZ GAIN ADJUST | 0, 0 | 0<\|EG\|<31 |
| | | | 0, 1 | 31<\|EG\|<44 |
| | | | 1, 0 | 44<"EG\|<51 |
| | | | 1, 1 | 51<\|EG\| |
| | | | ONE DEGREE OF EL GIMBAL ANGLE (EG) HYSTERESIS | |
| D0 | 3,4 | MEDIUM RATE HIGH RATE | 0, 0 | LOW RATE |
| | | | 0, 1 | MEDIUM RATE |
| | | | 1, 0 | INT HIGH RATE |
| | | | 1, 1 | HIGH RATE |
| | | | BOTH AZ AND EL GYRO TORQUER AMPLIFIERS | |
| | 5 | 28V ANTENNA MOTOR ENABLE | 1 = 28V RELAY ENERGIZED | |
| | 6 | AZ POSITION LOOP SELECT | 1 = AZ POSITION MODE<br>0 = AZ RATE MODE | |
| | 7 | EL POSITION LOOP SELECT | 1 = EL POSITION MODE<br>0 = EL RATE MODE | |
| | 8 | NULL HORN SELECT | 1 = NULL HORN ENABLED | |
| | 9 | PENCIL SELECT | 1 = PENCIL BEAM<br>0 = MAPPING BEAM | |
| 2<br>A01 | 0 –> 11 | AZ RATE/POSITION COMMAND | POSITION MODE<br>MSB = 72.0 DEGREES RIGHT<br>POSITIVE = LEFT | |
| 3<br>A02 | 0 –> 11 | EL RATE/POSITION COMMAND | POSITION MODE<br>MSB = 72.0 DEGREES UP<br>POSITIVE = DOWN | |

What is claimed is:

1. A portable automated test system for use in an antenna system, that includes an antenna control interface having a digital control word input and a plurality of mode-of-operation inputs, comprising:

a plurality of shift registers, each shift register having a serial data output, a serial data input, a parallel input, and a shift command input, the plurality of shift registers forming a chain of registers having a start register and an end register, and having the serial data output of the start register connected to the serial data input of the next register and the remainder of the plurality of registers having the serial data output of the previous register connected to the serial data input of the next register and the last register in the chain being connected to the digital control word input;

a clock signal, connected to the shift command inputs and synchronized to drive the digital control words in the plurality of shift registers through the chain of registers and into the digital control word input; and a plurality of mode-of-operation signal lines connected to the mode-of-operation inputs and synchronized with the digital control words to enable the receive mode of the antenna to receive the digital control words from the shift registers;

whereby when the digital control words are placed into the shift registers through the parallel inputs of the shift registers, the clock signal serially pumps the digital command words through the shift registers and out the serial output of the last register in the chain and into the digital control word input and these control words are synchronized with the mode-of-operation signals to perform automated testing of the antenna system.

2. A portable automated test system as recited in claim 1, wherein the parallel inputs to the shift registers are manually adjusted.

3. A portable automated test system as recited in claim 2, wherein the parallel inputs to the shift registers are adjusted by DIP switches.

4. A portable automated test system as recited in claim 1, wherein the parallel inputs to the shift registers are controlled by a standard commercial computer.

5. A portable automated test system for use in an F-18 fire control radar antenna system having a digital control word input, and a plurality of mode-of-operation inputs, comprising:

a first shift register having a first shift command input, a first parallel input, a first shift command input, and a first serial data output and said first shift register receiving a digital control word through the first parallel input that contains digital information to control the type of test to be performed on the antenna, digital information that controls the azimuth gain of the antenna, digital information that controls the rate of change of the antenna, digital information that enables the antenna motor, digital information that controls the azimuth position of the antenna, digital information that selects the elevation position loop of the antenna, digital information that controls the null horn selection of the antenna, and digital information that controls the pencil selection of the antenna;

a second shift register having a second shift command input, a second serial data input connected to said first serial data output, and a second parallel input, and a second serial data output and said second shift register receiving digital information through the second parallel input that controls the azimuth rate and position of the antenna;

a third shift register having a third shift command input, a third serial data input connected to said second serial data output, a third parallel input, and a third serial data output and said third shift register receiving digital information through said third parallel input that controls the elevation rate and position of the antenna;

a 1-MHz clock signal with a 4-microsecond gap in the signal every 16 microseconds and connected to the shift command input of said first, second and third shift registers;

a trigger signal with a 100-microsecond cycle that pulses high for 96 microseconds and then low for 4 microseconds;

a first mode-of-operation signal having 1 cycle that remains in a digital high state for 60 microseconds and the cycle being synchronized with the start of each 100-microsecond cycle of the trigger signal; and a second mode-of-operation signal that pulses 3 cycles, each said cycle having 16 microseconds in a digital low state and then 4 microseconds digital high, and the start of the 3 cycles being synchronized to begin at the start of each 100 microsecond cycle of the trigger signal;

whereby when the digital control words are placed into the shift registers through the parallel inputs of the first, second and third shift registers, the 1-MHz clock signal serially pumps the digital command words through said first, second and third shift registers and out the serial output of the third shift register and into the digital control word input and these control words are synchronized with the first and second mode-of-operation signals to perform automated testing of the F-18 fire control radar system antenna.

6. A portable automated test system as recited in claim 5, wherein the parallel inputs to the shift registers are manually adjusted.

7. A portable automated test system as recited in claim 6 wherein the parallel inputs to the shift registers are adjusted by DIP switches.

8. A portable automated test system as recited in claim 5 wherein the parallel inputs to the shift registers are controlled by a standard commercial computer.

* * * * *